Oct. 11, 1938.   S. M. WECKSTEIN   2,132,838
BEARING AND CLOSURE
Filed March 11, 1937
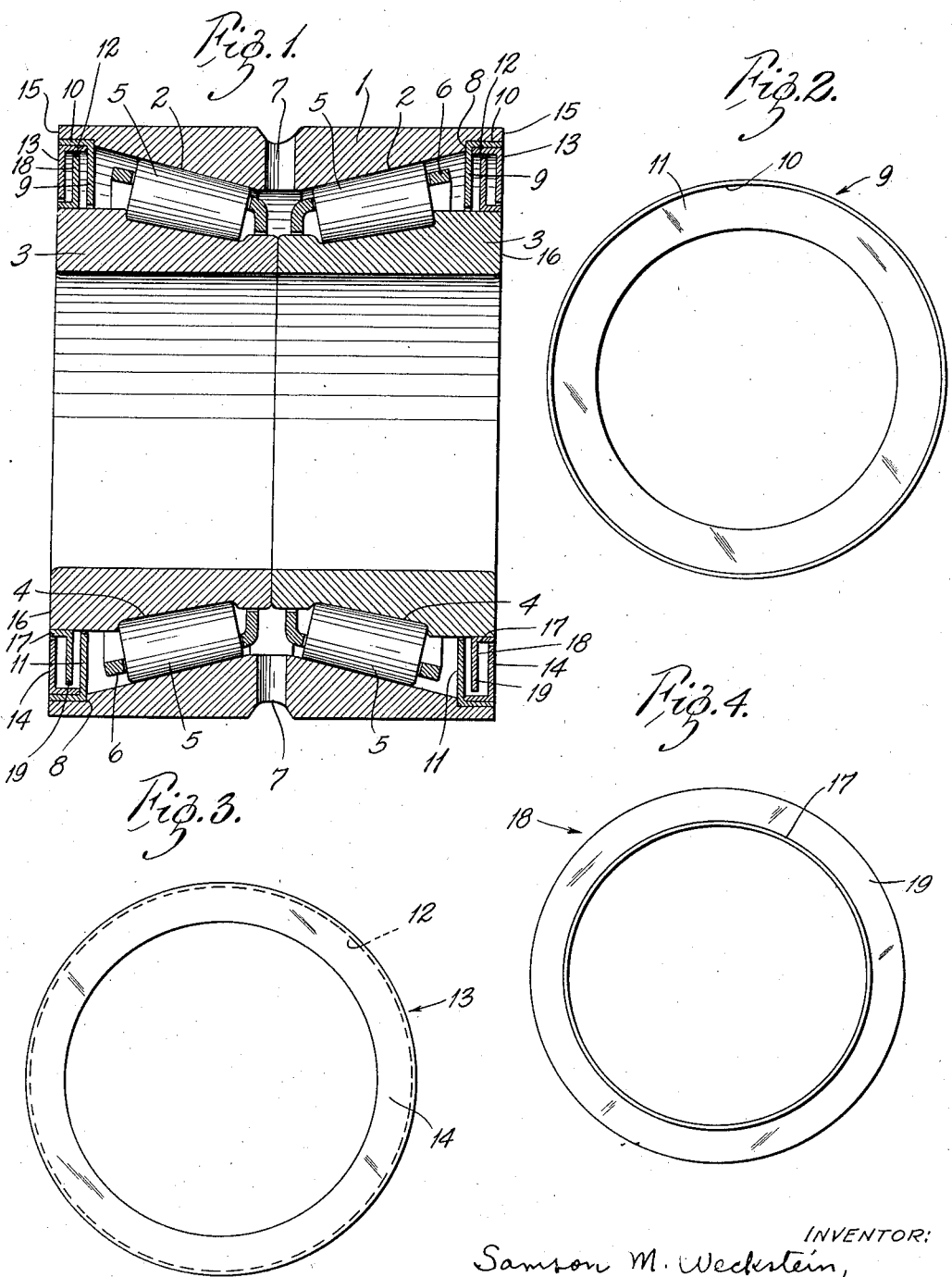
INVENTOR:
Samson M. Weckstein,
by Cantlan & Gravely,
HIS ATTORNEYS.

Patented Oct. 11, 1938

2,132,838

UNITED STATES PATENT OFFICE 2,132,838

BEARING AND CLOSURE

Samson M. Weckstein, Canton, Ohio, assignor to
The Timken Roller Bearing Company, Canton,
Ohio, a corporation of Ohio Application March 11, 1937, Serial No. 130,265

2 Claims. (Cl. 286—5)

My invention relates to closure members for bearings, particularly to closure members for the ends of a double row taper roller bearing, making said bearing self-contained.

The invention has for its principal object a closure which is simple and sturdy in construction and which can be applied to the bearing before shipment, so that the bearing and closure may be installed as a unit.

The invention consists principally in a closure member comprising telescoping sleeve members fixed in the end of the bearing cup and having radical flanges and a sleeve member fixed on the cone and having a radial flange extending into the space between the flanges of the cup member. The invention further consists in the bearing and closure and in the parts and combinations and arrangements of parts hereinafter described and claimed.

In the accompanying drawing,

Fig. 1 is a longitudinal sectional view of a bearing and closure embodying my invention; and Figs. 2, 3 and 4 are elevational views of the parts making up the closure.

In the drawing is illustrated a double row taper roller bearing, including a double cup 1 or outer bearing member having conical raceways 2 that taper toward the middle of the cup, two cones 3 or inner bearing members, each having a conical raceway 4 corresponding to one of the cup raceways 2, a series of conical bearing rollers 5 interposed between each pair of cone raceways 4 and cup raceways 2, and cages 6 for maintaining the spacing of the rollers. The cup is provided with radial passageways 7 at its middle through which the bearing may be lubricated.

Each end of the cup is counterbored and against each internal shoulder 8 in the cup is seated the corner portion of an angular ring member 9 having a sleeve portion 10 pressed in the cup and a radial flange 11 extending inwardly almost to the periphery of the end portion of the cone 3. Telescoped into said sleeve portion 10 is the sleeve portion 12 of a second angular ring member 13 which also has a radial flange 14. The outer face of said radial flange 14 of said second angular ring 13 and the outer end of the sleeve portion 10 of said first ring 9 are flush with the end face 15 of the cup and the end face 16 of the cone.

Pressed onto the outer periphery of the cone 3 is the sleeve portion 17 of an angular ring member 18 which has an outwardly projecting radial flange 19 extending into the space between the radial flange 11 and the radial flange 14. The width of the radial flange 14 of the second cup ring member 13 is such that its inner periphery is spaced slightly from the outer periphery of the sleeve portion 17 of the cone ring member 18.

The annular ring members 9, 13 and 18 may be assembled and the complete enclosure pressed in place as a unit. The outer ring 9 is pressed into the cup and the ring 18 is pressed onto the cone, the length of the sleeve portion 17 thereof being such as to insure the proper location of the radial flange 19.

As the cup ring members and the cone ring member are rigidly mounted, the closure members at the two ends of the bearing make the double row bearing self-contained for shipment purposes. The adjustment may be built into the bearing before shipment, so that the proper mounting of the bearing is greatly facilitated. The closure members are flush with the ends of the bearing, thus minimizing the danger of injury in handling. The hardened end 15 of the cup is exposed for clamping against a seat, thus avoiding wear on the softer closure members. The bearing may be packed with grease before shipment, thus avoiding entry of foreign matter during shipment. The closure is made of simple stamped parts, so that the manufacture thereof and the assembling thereof are simple and inexpensive. The bearing and closure members are mounted as a unit, instead of the separate mounting of bearing and closure members commonly required.

What I claim is:

1. A closure for the end of a roller bearing comprising an angular ring for seating in the end of the outer bearing member of said bearing, facing outwardly, a second inwardly facing angular ring nested in said first named angular ring, said angular rings having inwardly extending spaced radial flanges and an angular ring having a sleeve portion for pressing on the inner bearing member and having a radial flange extending into the space between the radial flanges of said first and second named rings said sleeve portion of said third angular ring extending outwardly and being of such length that said ring is in proper position when the end of said sleeve is flush with the outer face of said second ring.

2. A self-contained bearing closure comprising an angular ring having a flange disposed radially and an outer peripheral flange, a second angular ring having a peripheral flange nested in the peripheral flange of said first ring and a radial flange at the end remote from the radial flange of said first ring and a third angular ring having a radial flange disposed between the radial flanges of said first two angular rings and an inner peripheral sleeve or flange, said sleeve being of such length that the radial flange of said third ring is properly positioned when the end of said sleeve is flush with the outer face of one of said radial flanges.

SAMSON M. WECKSTEIN.